United States Patent

[11] 3,576,364

| [72] | Inventor | Louis Anthony Zanoni |
| | | Trenton, N.J. |
| [21] | Appl. No. | 826,159 |
| [22] | Filed | May 20, 1969 |
| [45] | Patented | Apr. 27, 1971 |
| [73] | Assignee | RCA Corporation |

[54] COLOR ADVERTISING DISPLAY EMPLOYING LIQUID CRYSTAL
4 Claims, 3 Drawing Figs.

[52] U.S. Cl..................................................... 353/28,
40/52, 40/106.52, 340/324, 340/338, 350/160,
352/87, 353/122
[51] Int. Cl.................................................... G02f 1/36
[50] Field of Search........................................ 40/52,
106.51, 106.52; 340/324.5, 338, 339; 352/85, 87,
81, 38, 39, 40, 46; 353/122, 28; 350/150, 160

[56] References Cited
UNITED STATES PATENTS

| 1,096,778 | 5/1914 | Clement........................ | 58/50 |
| 1,230,348 | 6/1917 | Wadman....................... | 40/106.52 |
| 1,938,538 | 12/1933 | Henninger, Jr................ | 352/81 |
| 1,945,721 | 2/1934 | Aubuchon, Jr................. | 352/41 |
| 1,945,722 | 2/1934 | Aubuchon, Jr................. | 352/41 |
| 2,733,923 | 2/1956 | Sterner et al.................. | 273/102.2 |
| 3,114,836 | 12/1963 | Fergason et al................ | 250/83 |
| 3,154,871 | 11/1964 | Saila............................ | 40/130 |
| 3,167,607 | 1/1965 | Marks et al.................... | 350/150 |
| 3,322,485 | 5/1967 | Williams....................... | 350/160 |
| 3,401,262 | 10/1968 | Fergason et al................ | 250/83 |
| 3,410,999 | 11/1968 | Fergason et al................ | 250/43.5 |
| 3,416,248 | 12/1968 | Kalt et al...................... | 40/52 |
| 3,440,620 | 4/1969 | French......................... | 340/173 |
| 3,499,112 | 3/1970 | Heibneier et al............... | 178/7.7 |
| 3,499,702 | 3/1970 | Goldmacher et al........... | 350/150 |
| 3,218,919 | 11/1965 | Stuener et al.................. | 353/20 |
| 3,303,488 | 2/1967 | Anderson...................... | 340/324 |
| 3,469,206 | 9/1969 | Harris et al.................... | 331/94.5 |

OTHER REFERENCES
CHEMICAL & ENGINEERING NEWS: pp. 32—33, Sept. 30, 1968
THE GLASS INDUSTRY, Aug. 1968, pp. 423—425
SCIENCE NEWS, Vol. 93, pg. 598, June, 1968
RADIO-TV EXPERIMENTER AND SCIENCE AND ELECTRONICS June-July, 1969, pp. 31—35 & 106

*Primary Examiner*—Ronald L. Wibert
*Assistant Examiner*—Edward S. Bauer
*Attorney*—H. Christoffersen

ABSTRACT: A color picture is projected onto a liquid crystal display panel and becomes visible, in color, at those areas of the panel at which the liquid crystal is concurrently excited by the application of an electric field. A "moving" picture is simulated by selectively removing (or applying) the electric field from (or to) different areas of the panel during successive time intervals.

PATENTED APR 27 1971 3,576,364

INVENTOR
Louis Anthony Zanoni
BY
ATTORNEY

COLOR ADVERTISING DISPLAY EMPLOYING LIQUID CRYSTAL

BACKGROUND OF THE INVENTION

The article "Dynamic Scattering: A New Electro-Optic Effect..." by G. H. Heilmeier, L. A. Barton and the present inventor in the Proceedings of the IEEE, Volume 56, No. 7, July, 1968, discusses nematic liquid crystals of a type of interest in the present application. As explained there, such crystals, when in an unexcited state are relatively transparent to light and when placed in an excited state by an applied electric field, scatter light. The light scattering, termed "dynamic scattering," is believed to result from turbulence developed in the crystal.

The object of the present invention is to provide a relatively low-cost color picture display panel suitable for point-of-sale advertising and also for larger displays, such as billboards, employing liquid crystals.

SUMMARY OF THE INVENTION

Means for producing a color image and a screen for receiving the color image. The screen comprises a liquid crystal located between two electrodes, at least one of which is transparent, and across which electrical excitation may be applied for changing the optical state of the liquid crystal.

DETAILED DESCRIPTION

Figure 1:
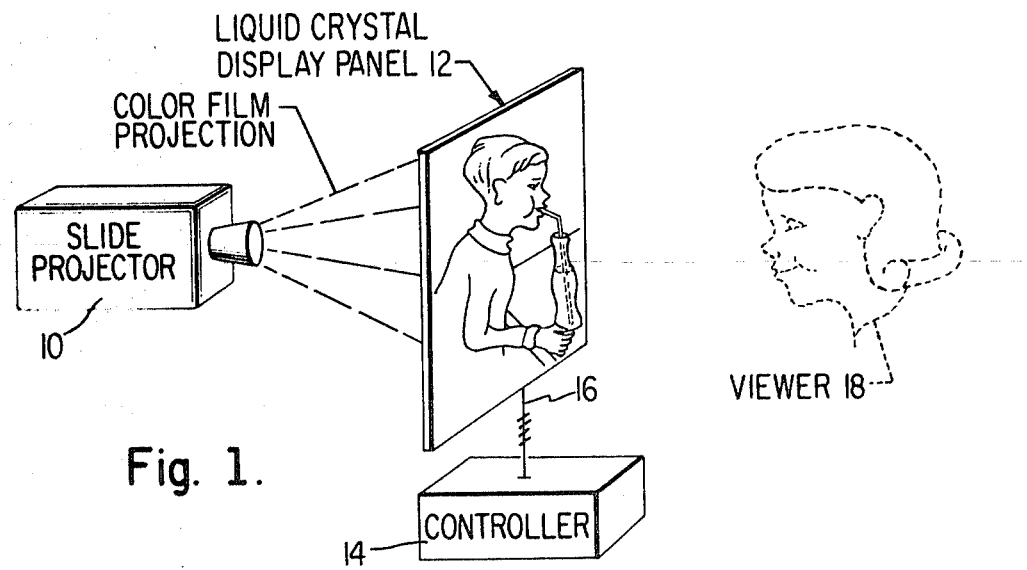
FIG. 1 is a schematic showing of the display system embodying the invention.

The system shown in FIG. 1 includes a slide projector 10 suitable for color transparencies and a liquid crystal display panel 12 serving as the screen for the slide projector. The panel may comprise two glass sheets serving as the front and back surfaces of the panel and a liquid crystal forming a very thin layer between the two sheets. In between the liquid crystal and each glass sheet are transparent electrodes across which an electric field may be applied. A more detailed discussion of a preferred panel construction is given below in connection with FIG. 2.

The operation of the display panel is under the control of controller 14, the details of which are given later. It is connected to the panel by a multiple conductor cable 16. The picture appearing on the panel may be observed by a viewer 18 preferably located in front of the panel, as shown.

In the operation of the system of FIG. 1, a color film is projected onto the back surface of the liquid crystal panel. If the liquid crystal is in its inactive state, no picture is visible on the panel. However, it has been discovered that when a voltage is applied to the electrodes of the panel of sufficient magnitude to cause dynamic scattering to occur, the color picture becomes visible, in color. If, as indicated, both front and back electrodes are transparent, the best picture is observed through the front of the panel by a viewer located at 18. It is also found, however, that it is possible to see a color picture reflected from the panel by an observer located on the slide projector side of the panel. The intensity and quality of this reflected picture is enhanced if a reflecting material is coated on the front surface of the panel (the surface which is visible in FIG. 1).

For advertising purposes, it is often desirable to simulate a "moving" picture. This is accomplished in the manner shown in FIG. 2. In this particular example, the picture display is a boy drinking soda pop through a straw.

Figure 2:
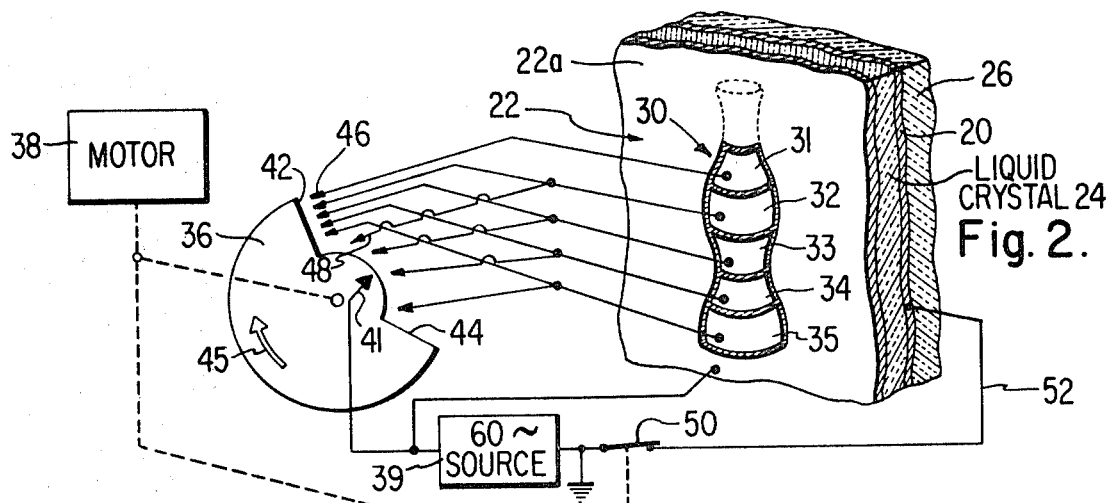
FIG. 2 is a drawing showing the details of the controller of FIG. 1 and showing also a portion of the liquid crystal display panel.

Referring now to FIG. 2, which shows only the portion containing the bottle of the panel, the front and back electrodes are shown at 20 and 22 respectively, although their locations could be reversed. Each electrode is located between a glass sheet and the liquid crystal 24. To simplify the drawing, only one of the glass sheets, namely 26, is shown. The drawing is not to scale — the liquid crystal layer being very thin — perhaps a fraction of a mil (a typical value may be 0.0005 inch) in thickness.

The portion of the transparent back electrode 22 onto which the picture of the bottle is projected is illustrated at 30. It consists of five separate transparent electrode sections 31—35 which are insulated from one another and from the main portion 22a of the back electrode. The spacing between electrode sections 31—35 and between these electrodes and the main electrode section 22a is relatively small—for example, one one-hundredth of an inch, and is exaggerated in the FIG.

The electrode sections 31—35 and 22a are connected to brushes, shown in the FIG. as arrow heads. These brushes are arranged to be contacted by the rotatable cam-shaped, switch element 36. The latter continuously may be driven by motor 38. A 60 cycle source 39 is connected at one terminal to a brush 41 which continuously engages the cam-shaped switch element 36 and is connected at its other terminal to ground and to the transparent front electrode 20.

In the operation of the system of FIG. 2, in the position of a cam 36 shown, the 60 cycle source is connected at one terminal only to the back electrode section 22a and is connected at its other terminal to the front electrode 20. It may be assumed that the slide projector 10 of FIG. 1 is projecting a color film onto the screen and that the color picture of the soda pop bottle superimposes over the corresponding region of FIG. 2. Since the entire backplate 22 is energized except for the electrodes 31 through 35, the picture becomes visible on the display panel except that the bottle of soda pop appears to be empty.

Figure 3:
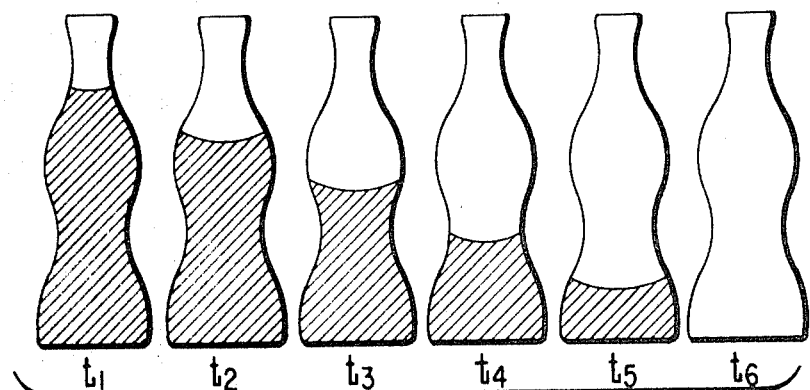
FIG. 3 is a drawing to help explain the simulation of a "-moving" picture in accordance with the invention.

The motor 38 continuously drives the cam 36 clockwise, as indicated by arrow 45. When the edge 42 reaches the five radially aligned brushes immediately adjacent to that edge, the electrodes 31 through 35 are energized simultaneously, the liquid crystal between these five sections and the front electrode 20 becomes excited, and the soda in the bottle becomes visible in the color in which it is projected by the projector 10. The bottle appears to be full of soda, see $t_1$ in FIG. 3, and the remainder of the picture, as shown in FIG. 1, is also visible to the viewer.

When, about two-thirds of the cam 36 cycle later, the other edge 44 of cam 36 passes beyond the brush 46, power is removed from electrode 31. The liquid crystal between this electrode and electrode 20 returns to its unexcited state, and the picture of the bottle changes from that shown at $t_1$ to that shown at $t_2$, both in FIG. 3. A short time later at $t_3$, edge 44 passes beyond the brush 48, disconnecting source 39 from electrode 32. Now power is absent both from electrodes 31 and 32, the liquid crystal between these two electrodes and the front electrode 20 is in its unexcited state, and the level of liquid appears to move down in the bottle as shown at $t_3$ in FIG. 3. This sequence of steps continues until the bottle appears empty.

If desired, by appropriate switching at some later time in the cycle, the entire picture may be erased. For example, there may be a switch 50 controlled by motor 38 and in series with the ground lead. It may be opened to disconnect the lead 52 for the transparent electrode 20 from power supply 39 and thereby to remove the electric field from across the liquid crystal. This causes the entire picture to be erased. A convenient interval to do this is for a short period immediately before and terminating when the cam edge 42 reaches brush 46 and the other four brushes radially aligned therewith, so that the entire picture including the bottle goes on at the same time.

While the voltage source 39 is shown to comprise a relatively low-frequency source such as a 60 cycle source, it may instead be a direct voltage source. The alternating voltage source is preferred as it provides greater operating life for the liquid crystal. For a typical thickness say of one-half mil for the liquid crystal layer, an alternating voltage of 10 to 40 volts or so R.M.S. or a direct voltage of 10 to 40 volts or so is suitable for exciting the crystal (depending upon the thickness of the liquid crystal layer, temperature, crystal material and so on).

The materials employed in fabricating the liquid crystal display panel are known as are various forms of liquid crystal which may be employed. As an example of the former, the transparent electrodes may be formed of tin oxide or any one of a number of transparent conducting materials. Examples of liquid crystals of the nematic type operating on the principle of dynamic scattering are given in the article and elsewhere in the literature.

The effect discussed herein, while illustrated by reference to nematic liquid crystals operating on the principle of dynamic scattering is present also in other liquid crystals. Many examples of such crystals are also given in the literature. In addition, the effect is present both in liquid crystals which in their unexcited state are relatively transparent as discussed above and also liquid crystals which are opalescent in their unexcited state and turn clear in response to the application of an electric field or current. The way in which the latter type of crystal is operated is, of course, complementary to that discussed above.

In the embodiment of the invention illustrated, a slide projector is employed. It is to be understood that the invention can be operated without the need for a slide projector by placing the color transparency in direct contact with the back surface of the liquid crystal display panel. Here, lenses associated with the projector are not needed. It is only necessary to employ a light source for shining light through the color transparency to cause the color image to be projected onto the crystal. In this embodiment of the invention, the back electrode is transparent and the glass backplate is preferably relatively thin. It is also clear that in this embodiment, the picture is viewed from in front of the panel just as in the embodiment of FIG. 1. The claims are intended to be generic both to this embodiment and the one of FIG. 1.

In the embodiment of the invention illustrated in FIG. 2, the back electrode 22 is segmented and the front electrode 20 is continuous. If desired, both electrodes may be segmented. For example, sections 31—35 may appear in the same position at both front and back electrodes. Further, if desired, these sections may be connected in such a way that the field between sections 31 of the front and back electrodes is in one direction, the field between sections 32 in the opposite direction, the field between sections 33 in the first direction, and so on. This may be accomplished, for example, by connecting sections 31, 33 and 35 at one electrode to ground and sections 32 and 34 of the other electrode to ground, and connecting the remaining sections of 31—35 via cam 36 to the 60 cycle source, as shown in FIG. 2.

One last point worth mentioning is that the technique of the present invention may be employed either for selectively erasing or selectively displaying a color picture. Here, one of the electrodes may be formed, for example, as a plurality of parallel bands spaced from one another by small distances. An entire picture may be displayed, for example, by connecting all of these bands to one terminal of a power supply and connecting the electrode at the other surface of the liquid crystal to the other terminal of the power supply. The picture may be erased, a band at a time, by disconnecting bands in sequence from the power supply, or may be turned on, a section at a time, by the reverse procedure.

I claim:
1. In combination:
   a liquid crystal display panel including a liquid crystal layer having two different optical states, at least one transparent electrode at one surface of said liquid crystal layer, and a second electrode at the other surface of said liquid crystal layer;
   means for producing a color picture and applying it to said panel through said transparent electrode so that said color picture is visible at those areas of the panel where an electric field is applied; and
   means for causing a simulated motion of sections of said color picture by controlling electrical excitation across said sections of said electrodes for causing regions of said crystal layer to change from one optical state to the other.

2. In the combination set forth in claim 1, said liquid crystal being one of the nematic type operating on the principle of dynamic scattering.

3. In the combination set forth in claim 1, one of said electrodes comprising a plurality of discrete sections, and said last-named means comprising means for selectively applying an electric filed between said sections and said other electrode.

4. An advertising display for displaying a color picture which may be erased a part at a time or turned on a part at a time comprising, in combination:
   a liquid crystal display panel comprising a sheet of liquid crystal material located between two transparent electrodes, a t least one of said electrodes formed as a plurality of discrete sections a group of which together correspond in shape to one portion of said color picture;
   means for projecting said color picture onto said panel with the portion of the picture of the shape of said group of sections superimposed on said sections; and
   means for selectively applying an electric field of sufficient intensity to excite said liquid crystal between one or more of the sections of said one electrode and the other electrode to cause simulated motion of said shape.